United States Patent
Dobashi (10) Patent No.: US 11,625,963 B2
(45) Date of Patent: Apr. 11, 2023

(54) MANAGEMENT APPARATUS, CONTROL METHOD FOR MANAGEMENT APPARATUS, AND NON-TRANSITORY COMPUTER-READABLE STORAGE MEDIUM

(71) Applicant: HONDA MOTOR CO., LTD., Tokyo (JP)

(72) Inventor: Manabu Dobashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 503 days.

(21) Appl. No.: 16/741,883

(22) Filed: Jan. 14, 2020

(65) Prior Publication Data

US 2020/0242861 A1   Jul. 30, 2020

(30) Foreign Application Priority Data

Jan. 25, 2019   (JP) .............................. JP2019-011342

(51) Int. Cl.
   *G07C 5/08*   (2006.01)
   *G07C 5/00*   (2006.01)
   *G05D 1/02*   (2020.01)

(52) U.S. Cl.
   CPC ......... *G07C 5/0816* (2013.01); *G05D 1/0223* (2013.01); *G07C 5/008* (2013.01); *G07C 5/0841* (2013.01); *G05D 2201/0213* (2013.01)

(58) Field of Classification Search
   CPC .... G07C 5/0816; G07C 5/008; G07C 5/0841; G05D 1/0223; G05D 2201/0213; G05D 2201/0208; G05D 2201/0201
   See application file for complete search history.

(56) References Cited

U.S. PATENT DOCUMENTS

| | | | |
|---|---|---|---|
| 6,933,884 B2 | 8/2005 | Martin et al. | |
| 2004/0217900 A1 | 11/2004 | Martin et al. | |
| 2018/0151070 A1* | 5/2018 | Katou | G06Q 50/30 |
| 2019/0104675 A1* | 4/2019 | Shinkai | B60W 10/06 |
| 2021/0286374 A1* | 9/2021 | Hiljanen | G07C 5/006 |

FOREIGN PATENT DOCUMENTS

| | | | |
|---|---|---|---|
| JP | 2010-287069 A | 12/2010 | |
| JP | 2017-004347 A | 1/2017 | |
| JP | 2017-209069 A | 11/2017 | |

OTHER PUBLICATIONS

English Translation of JP2008148644A Author: Umemoto et al. Title: Operation Mechanism of Work Vehicle Date: Jul. 3, 2008 (Year: 2008).*

Japanese Office Action for Japanese Patent Application No. 2019-011342 dated Oct. 21, 2022 (partially translated).

* cited by examiner

*Primary Examiner* — James J Lee
*Assistant Examiner* — Steven Vu Nguyen
(74) *Attorney, Agent, or Firm* — Thomas | Horstemeyer, LLP (57) ABSTRACT

A management apparatus for managing a work machine capable of operating in a plurality of work modes, comprising: a work information reception unit configured to receive work information of the work machine; a change information reception unit configured to receive, if a work mode of the work machine is changed, work mode change information from the work machine; a storage unit configured to store the work information and the work mode in association with each other; and a specifying unit configured to specify a failure based on information stored in the storage unit.

12 Claims, 6 Drawing Sheets

| WORK MODE | | | |
|---|---|---|---|
| ROTATION SPEED OF BLADE | LOW SPEED | MEDIUM SPEED | HIGH SPEED |
| TRAVELING SPEED | LOW SPEED | MEDIUM SPEED | HIGH SPEED |
| WORK TIME | SHORT TIME | MEDIUM TIME | LONG TIME |
| WORK START POINT | POINT A | POINT B | POINT C |

FIG. 6B

| WORK INFORMATION | |
|---|---|
| 1 | SLIP RATIO |
| 2 | ENGINE SPEED |
| 3 | BLADE LOAD |
| 4 | WORK COMPLETION RATIO |

MANAGEMENT APPARATUS, CONTROL METHOD FOR MANAGEMENT APPARATUS, AND NON-TRANSITORY COMPUTER-READABLE STORAGE MEDIUM

CROSS-REFERENCE TO RELATED APPLICATION(S)

This application claims priority to and the benefit of Japanese Patent Application No. 2019-011342 filed on Jan. 25, 2019, the entire disclosure of which is incorporated herein by reference.

BACKGROUND OF THE INVENTION

Field of the Invention

The present invention relates to a management apparatus, a control method for the management apparatus, and a non-transitory computer-readable storage medium.

Description of the Related Art

U.S. Pat. No. 6,933,884 discloses a system in which a work machine (ship) and a server are communicably connected to each other, and the server acquires, by wireless communication, various kinds of information (position information, engine speed, throttle opening, and the like) obtained by the sensors of the work machine and the like. Since such system can remotely monitor the work machine, if a failure or the like occurs in the work machine, it is possible to cope with this quickly.

However, if the work machine has a plurality of work modes, the user may change the work mode in accordance with a work condition. In the technique described in U.S. Pat. No. 6,933,884, however, the server only receives various kinds of information, and the contents of the kinds of information obtained in different work modes are not considered at all. Consequently, it is difficult to obtain detailed information such as a work mode in which a failure easily occurs.

The present invention has been made in consideration of the above problem, and provides a technique for grasping detailed information such as a work mode in which a failure easily occurs.

SUMMARY OF THE INVENTION

To solve the above problem, according to the present invention, there is provided a management apparatus for managing a work machine capable of operating in a plurality of work modes, comprising: a work information reception unit configured to receive work information of the work machine; a change information reception unit configured to receive, if a work mode of the work machine is changed, work mode change information from the work machine; a storage unit configured to store the work information and the work mode in association with each other; and a specifying unit configured to specify a failure based on information stored in the storage unit.

DESCRIPTION OF THE EMBODIMENTS

An embodiment of the present invention will be described below with reference to the accompanying drawings. Note that each drawing is merely a schematic view for explaining the embodiment, so the dimensions of each constituent element shown in the drawing do not necessarily reflect the actual dimensions. Note also that the same reference numerals in these drawings denote similar constituent elements, and an explanation of the same contents will be omitted in this specification.

<System Configuration>

Figure 1:
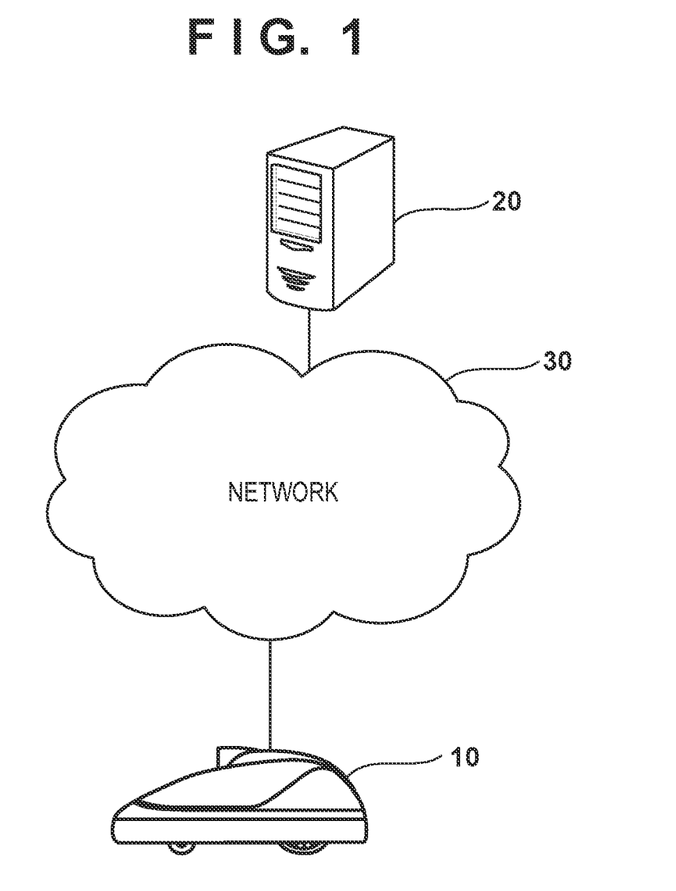
FIG. 1 is a view showing an example of the configuration of a management system according to an embodiment.

FIG. 1 is a view showing an example of the configuration of a management system according to an embodiment of the present invention. The management system is formed by including one or more work vehicles 10 and a management apparatus 20. The work vehicle 10 and the management apparatus 20 are configured to be communicable with each other via a network 30. The work vehicle 10 is, for example, an autonomous work machine (a lawn mower, a grass mower, a snow plow, a golf ball collection machine, or the like), and performs a predetermined work in a work area. The management apparatus 20 is a server apparatus, and can process various kinds of information collected from the work vehicle 10 to control the operation of the work vehicle while managing the work of the work vehicle 10. Note that in this embodiment, a lawn mower will be exemplified as the work vehicle 10.

<Arrangement of Work Vehicle>

Figure 2A:
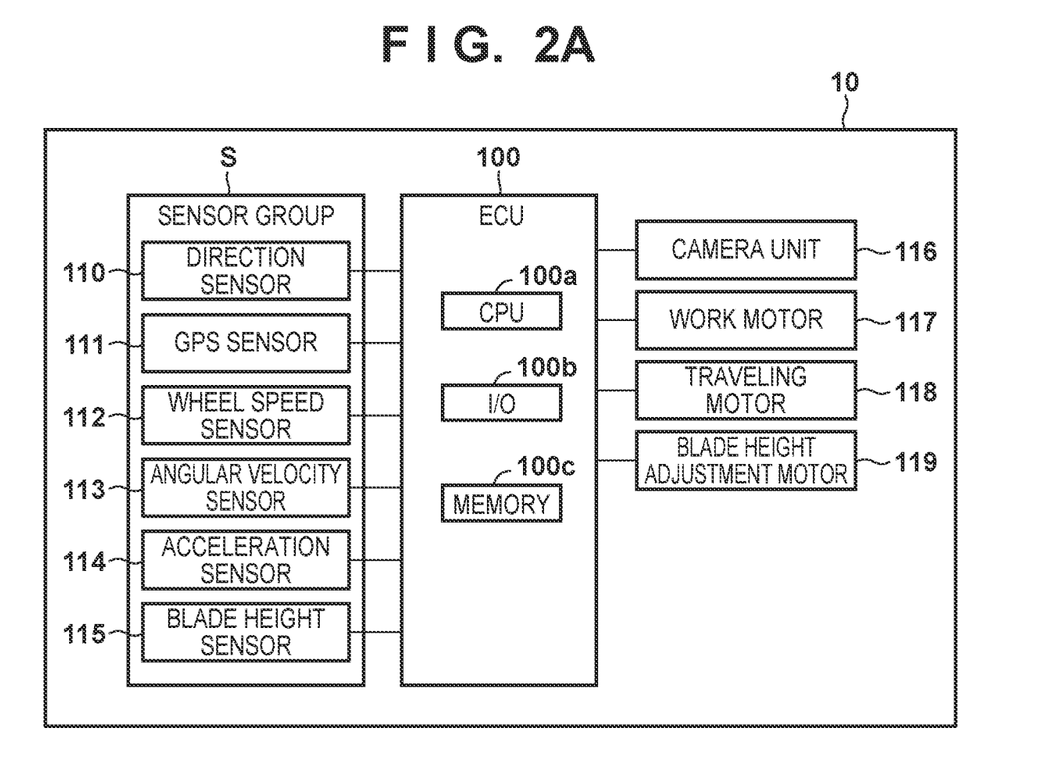
FIG. 2A is a block diagram showing an example of the hardware arrangement of a work vehicle according to the embodiment.

FIG. 2A is a block diagram showing an example of the hardware arrangement of a work vehicle according to the embodiment of the present invention. An ECU 100 is an electrical control unit including a microcomputer provided on a circuit board, and controls the operation of the work vehicle 10. The ECU 100 includes a CPU $100a$, an I/O $100b$, and a memory $100c$. The I/O $100b$ inputs/outputs various kinds of information. The memory $100c$ is a ROM (Read Only Memory), an EEPROM (Electrically Erasable Programmable Read Only Memory), a RAM (Random Access Memory), or the like. The memory $100c$ stores the work schedule of the work vehicle 10, information concerning a work area, work information, work mode information, various kinds of programs for controlling the operation of the work vehicle 10, and the like. The ECU 100 can operate as each processing unit for implementing the present invention by reading out and executing a program stored in the memory 100c.

The ECU 100 is connected to various types of sensors S. The sensors S include a direction sensor 110, a GPS sensor 111, a wheel speed sensor 112, an angular velocity sensor 113, an acceleration sensor 114, and a blade height sensor 115.

The direction sensor 110 and the GPS sensor 111 are sensors for acquiring information of the position and direction of the work vehicle 10. The direction sensor 110 detects the direction corresponding to the terrestrial magnetism. The GPS sensor 111 detects information indicating the current position (latitude and longitude) of the work vehicle 10 upon reception of radio waves from a GPS satellite.

The wheel speed sensor 112, the angular velocity sensor 113, and the acceleration sensor 114 are sensors for acquiring information concerning the moving state of the work vehicle 10. The wheel speed sensor 112 detects the wheel speeds of the left and right rear wheels. The angular velocity sensor 113 detects an angular velocity around a vertical axis (the z-axis in the vertical direction) of the barycentric position of the work vehicle 10. The acceleration sensor 114 detects accelerations in the orthogonal three axes acting on the work vehicle 10.

The blade height sensor 115 detects the height of a rotary blade for a lawn mowing work with respect to the ground surface of the work vehicle 10. The detection result of the blade height sensor 115 is output to the ECU 100. Under the control of the ECU 100, a blade height adjustment motor 119 is driven, and the blade moves in the vertical direction, thereby adjusting the height from the ground surface.

The outputs of the various types of sensors S are input to the ECU 100 via the I/O 100b. The ECU 100 controls a work motor 117, a traveling motor 118, and the blade height adjustment motor 119 based on the outputs of the various types of sensors S. The ECU 100 controls rotation of the blade by outputting a control value via the I/O 100b to control the work motor 117. The ECU 100 controls traveling of the work vehicle 10 by outputting a control value via the I/O 100b to control the traveling motor 118. Furthermore, the ECU 100 adjusts the height of the blade by outputting a control value via the I/O 100b to control the blade height adjustment motor 119. The I/O 100b can function as a communication interface, and can be connected, by a wire or wirelessly, to the management apparatus 20 or another apparatus (for example, a communication apparatus (smartphone) held by the user of the work vehicle 10) via the network 30.

The work vehicle 10 includes a camera unit 116 including a plurality of cameras, and calculates and acquires information of the distance between the work vehicle 10 and an object existing ahead using images captured by a plurality of cameras with parallaxes. Then, the operation of the work vehicle 10 is controlled based on the captured images and an object recognition model held in advance.

The work motor 117 is an electric motor arranged above the rotary blade for the lawn mowing work. The blade is connected to the work motor 117, and rotationally driven by the work motor 117. The traveling motor 118 includes two electric motors (motors) attached to the work vehicle 10. The two electric motors are connected to the left and right rear wheels, respectively. The front wheels serve as driven wheels, and the rear wheels serve as the driving wheels. The right wheels and the left wheels are independently rotated in the forward direction (rotation in the forward direction) or in the reverse direction (rotation in the reverse direction), thereby moving the work vehicle 10 in various directions. The blade height adjustment motor 119 is a motor for adjusting the height of the blade in the vertical direction with respect to the ground surface.

Figure 2B:
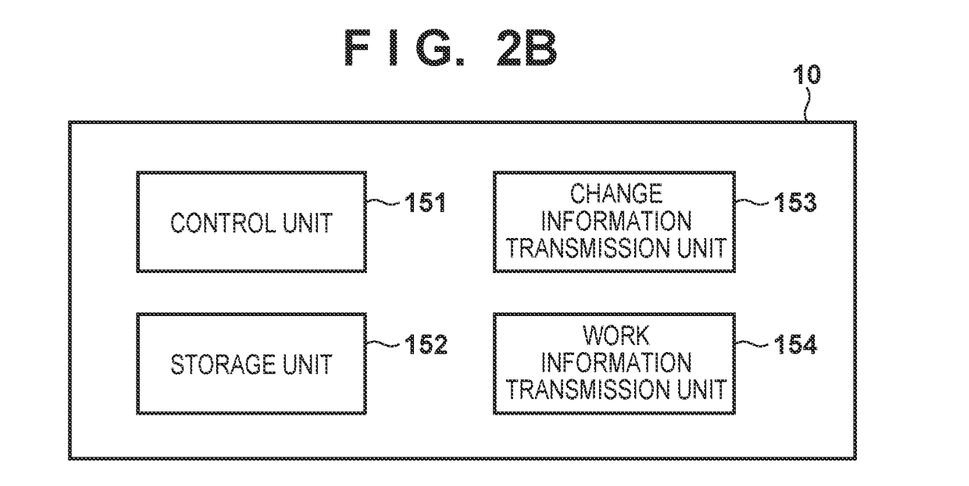
FIG. 2B is a block diagram showing an example of the functional arrangement of the work vehicle according to the embodiment.

Subsequently, FIG. 2B is a block diagram showing an example of the functional arrangement of the work vehicle according to the embodiment of the present invention. The work vehicle 10 includes a control unit 151, a storage unit 152, a change information transmission unit 153, and a work information transmission unit 154. The control unit 151 corresponds to the CPU 100a, and controls the operation of the work vehicle 10. The storage unit 152 corresponds to the memory 100c, and stores various kinds of information.

If the work mode of the work vehicle 10 is changed, the change information transmission unit 153 transmits change information to the management apparatus 20. This allows the management apparatus 20 to recognize the work mode in which the work vehicle 10 currently operates. The work mode is changed in accordance with, for example, a direct instruction by operating the work vehicle 10 by the user, an instruction via the communication apparatus (for example, a smartphone) held by the user, or a work mode change instruction received from the management apparatus 20.

Examples of the work modes will be described with reference to FIG. 6A. The work modes indicate preset work conditions. For example, there are modes concerning the rotation speed of the blade, modes concerning the traveling speed of the work vehicle 10, modes concerning a work time, and modes concerning a work start point. As the modes concerning the rotation speed of the blade, three modes of a low speed mode, a medium speed mode, and a high speed mode are set. As the modes concerning the traveling speed of the work vehicle 10, three modes of a low speed mode, a medium speed mode, and a high speed mode are set. If, for example, the high speed mode is set as the mode concerning the traveling speed, the work vehicle 10 performs a work at a traveling speed associated with the high speed mode.

Furthermore, as the modes concerning the work time during which the work vehicle 10 performs a work, three modes of a short time mode, a medium time mode, a long time mode are set. If, for example, the short time mode is set as the mode concerning the work time, the work vehicle 10 performs a work within a work time associated with the short time mode.

As the modes concerning the work start point at which the work vehicle 10 starts a work in the work area, three modes of a point A mode, a point B mode, and a point C mode are set. If, for example, the point C mode is set as the mode concerning the work start point, the work vehicle 10 starts a work by setting point C as a work start point.

Figure 6A:
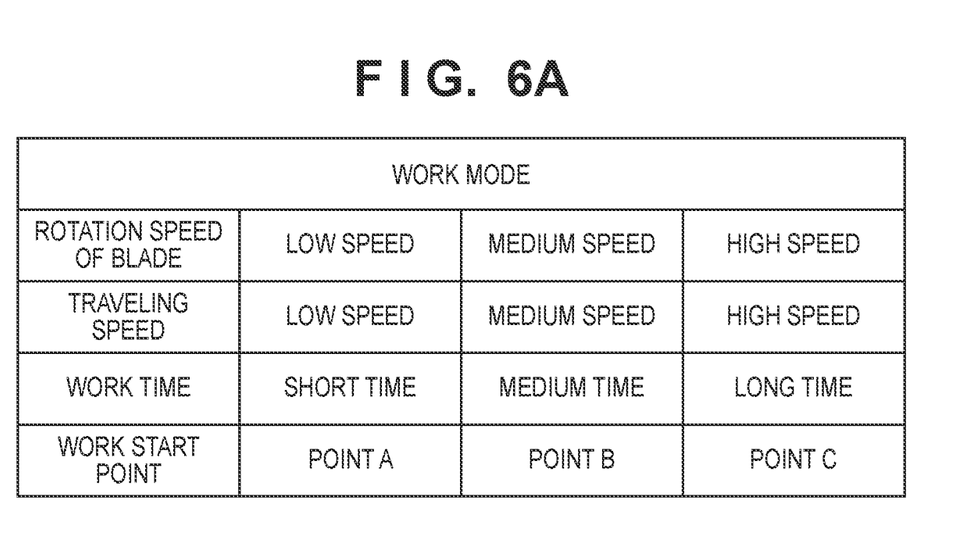
FIG. 6A is a table showing examples of work modes according to the embodiment.

Note that in the examples shown in FIG. 6A, for each mode, there are three kinds of modes. However, the kinds of modes are not limited to them. The number of modes may be two or four or more.

The work information transmission unit 154 transmits, to the management apparatus 20, work information concerning the work performed by the work vehicle 10. Thus, the management apparatus 20 can accumulate the work information of the work vehicle 10, and grasp specific work information obtained in a specific work mode. Therefore, by analyzing the work information, it is possible to specify a failure, and specify a more suitable work mode. The failure includes an unexpected situation such as a failure in the work vehicle 10 or a failure in the progress of the work.

Figure 6B:
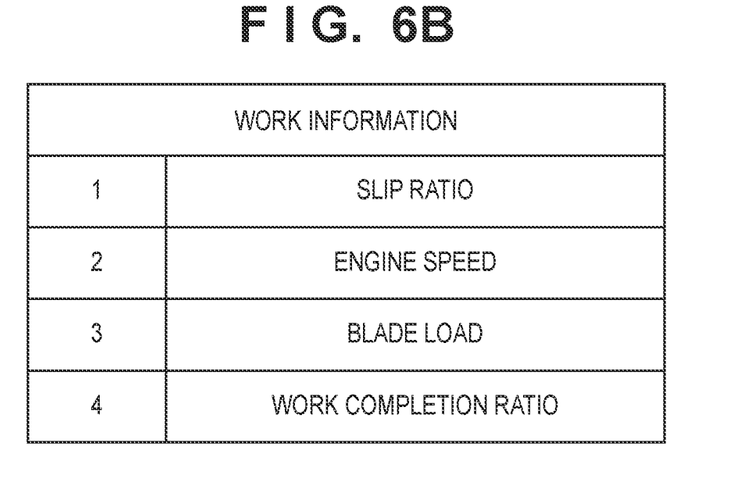
FIG. 6B is a table showing examples of work information according to the embodiment.

Examples of the work information will now be described with reference to FIG. 6B. The work information is information of a resultant object obtained as a result of performing a work by the work vehicle 10. For example, the information includes a slip ratio indicating the ratio at which the wheels of the work vehicle 10 slip, the engine speed of the traveling motor 118, the magnitude of a load imposed on the blade, or a work completion ratio indicating the ratio of a work completion area to a scheduled work area.

The slip ratio can be calculated by determining the presence/absence of a slip based on the sensor information of the wheel speed sensor 112, and can be calculated as, for example, slip count/traveling time. The engine speed can be acquired by detecting the rotation speed of the traveling motor 118. The magnitude of the load imposed on the blade can be determined by calculating the decrease of the actual rotation speed of the blade for a predetermined output from the work motor 117 with respect to an ideal value when no load is imposed. The ratio of the area, where the work vehicle 10 has traveled, to the area of the work area can be calculated by plotting the traveling history of the work vehicle 10 using the GPS sensor 111, thereby acquiring the work completion ratio.

The work vehicle 10 successively collects or calculates and updates the work information while performing the work. The work information transmission unit 154 transmits the work information to the management apparatus 20 periodically or in response to a request from the management apparatus 20.

<Arrangement of Management Apparatus>

Figure 3A:
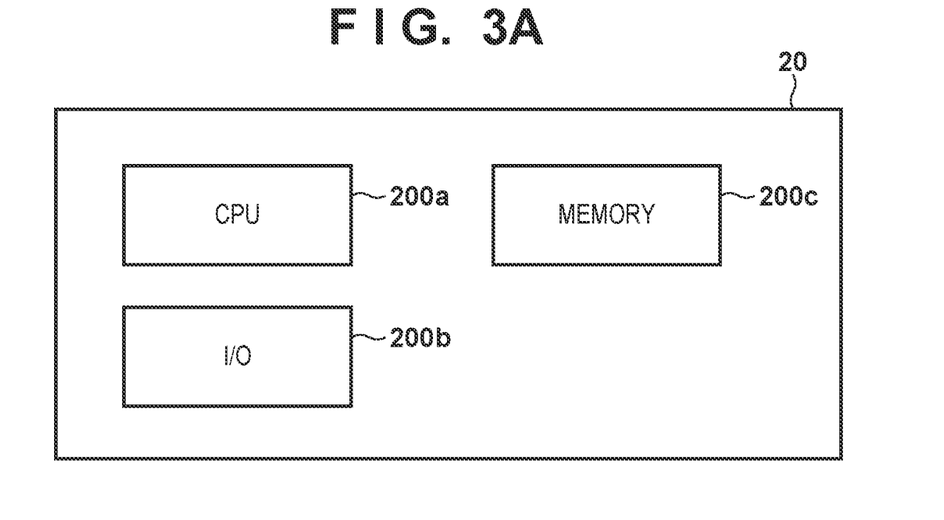
FIG. 3A is a block diagram showing an example of the hardware arrangement of a management apparatus according to the embodiment.

FIG. 3A is a block diagram showing an example of the hardware arrangement of the management apparatus according to the embodiment of the present invention. The management apparatus 20 is, for example, a server apparatus, and includes a CPU 200a, an I/O 200b, and a memory 200c.

The CPU 200a controls the operation of the management apparatus 20. The I/O 200b inputs/outputs various kinds of information. The memory 200c is a ROM (Read Only Memory), an EEPROM (Electrically Erasable Programmable Read Only Memory), a RAM (Random Access Memory), or the like. The memory 200c stores the work information of the work vehicle 10, the work mode information of the work vehicle 10, various kinds of programs for controlling the operation of the management apparatus 20, and the like. The CPU 200a can operate as each processing unit for implementing the present invention by reading out and executing a program stored in the memory 200c.

Figure 3B:
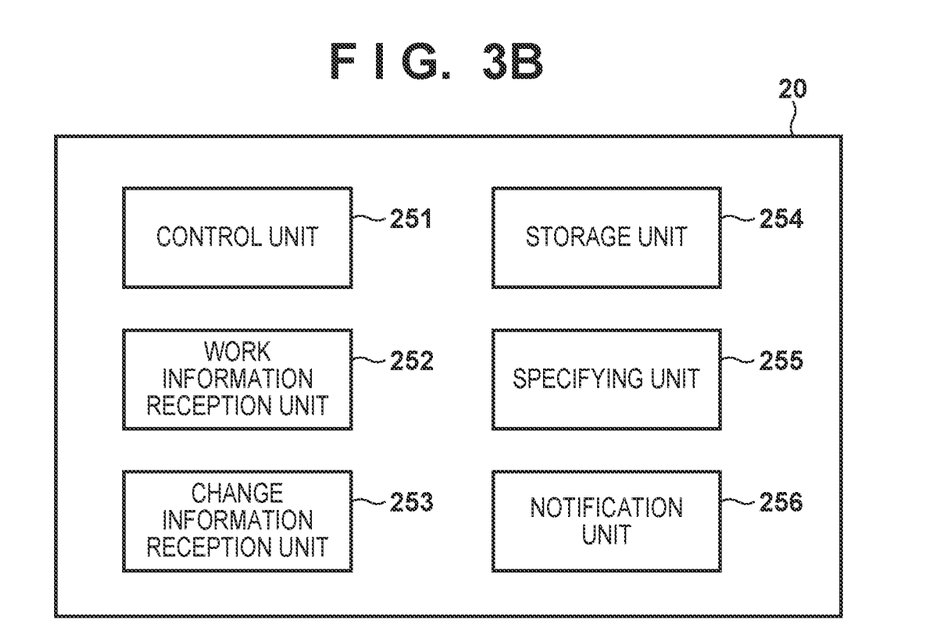
FIG. 3B is a block diagram showing an example of the functional arrangement of the management apparatus according to the embodiment.

Subsequently, FIG. 3B is a block diagram showing an example of the functional arrangement of the management apparatus according to the embodiment of the present invention. The management apparatus 20 includes a control unit 251, a work information reception unit 252, a change information reception unit 253, a storage unit 254, a specifying unit 255, and a notification unit 256.

The control unit 251 corresponds to the CPU 200a, and can control the operation of the management apparatus 20 and also control the operation of the work vehicle 10 by transmitting, to the work vehicle 10, a change instruction of the work mode in which the work vehicle 10 is operated.

The work information reception unit 252 receives the work information transmitted from the work vehicle 10. The change information reception unit 253 receives the work mode change information transmitted from the work vehicle 10. The control unit 251 stores, in the storage unit 254, the received work information in association with the work mode of the work vehicle 10 set when the work information is obtained. The storage unit 254 corresponds to the memory 200c, and stores various kinds of information.

The specifying unit 255 specifies the presence/absence, the increase/decrease, the cause, and the like of a failure by analyzing specific work information obtained in a specific mode based on the information accumulated in the storage unit 254 until now. Furthermore, the specifying unit 255 determines the work mode in which the failure is eliminated or decreases, thereby specifying a work mode to be recommended. In addition, the specifying unit 255 can specify which of the work modes before and after the change is more suitable or which of the plurality of work modes has higher work efficiency.

The notification unit 256 notifies the work vehicle 10 or the communication apparatus (for example, a smartphone) held by the user of information such as the recommended work mode, the more suitable work mode out of the work modes before and after the change, or the work mode with higher work efficiency among the plurality of work modes. The notification unit 256 may be configured to make a notification to the communication apparatus of the user to display notification contents on the display of the communication apparatus, thereby allowing the user to confirm the notification contents. Alternatively, the notification unit 256 may be configured to make a notification directly to not the communication apparatus but the work vehicle 10 to display notification contents on a display (not shown) provided in the work vehicle 10, thereby allowing the user to confirm the notification contents. After confirming the notification contents, the user may perform an operation of changing the work mode via the communication apparatus or by directly operating the work vehicle 10.

<Processing of Work Vehicle>

Figure 4:
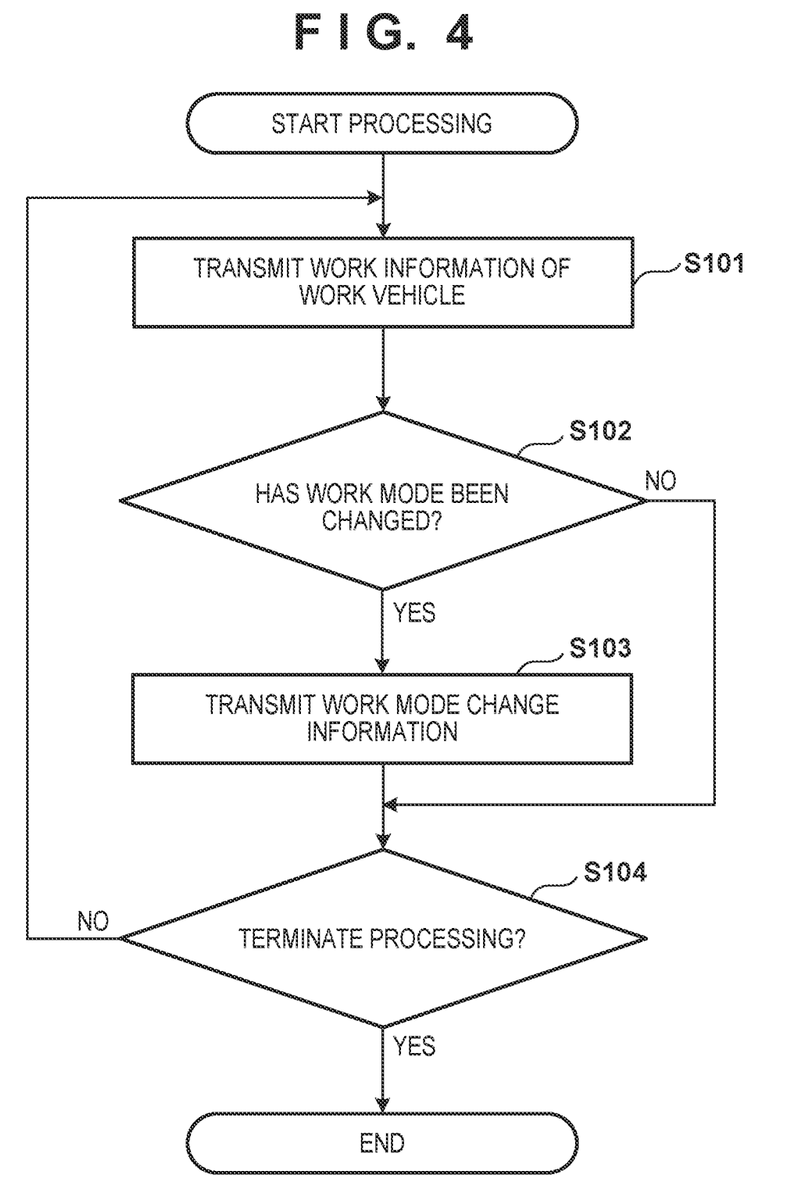
FIG. 4 is a flowchart illustrating the procedure of processing performed by the work vehicle according to the embodiment.

The procedure of processing executed by the work vehicle 10 according to this embodiment will be described next with reference to a flowchart shown in FIG. 4. In step S101, the work information transmission unit 154 transmits the work information of the work vehicle 10 to the management apparatus 20.

In step S102, the control unit 151 determines whether the work mode of the work vehicle 10 has been changed. The work mode may be changed when the user operates a mode change operation unit (not shown) provided in the work vehicle 10 or when a mode change instruction is transmitted to the work vehicle 10 via the communication apparatus (for example, a smartphone) held by the user. If the work mode has been changed, the process advances to step S103; otherwise, the process advances to step S104.

In step S103, the change information transmission unit 153 transmits information concerning the changed work mode as change information to the management apparatus 20. For example, if the work mode has been changed from work mode A to work mode B, information indicating that the work mode has been changed to work mode B is transmitted. Alternatively, information of the work modes before and after the work mode is changed (that is, the work mode before the change is work mode A and the work mode after the change is work mode B) may be transmitted.

In step S104, the control unit 151 determines whether to terminate the processing. If, for example, all the scheduled work is complete, the user presses a power off button (not shown) provided in the work vehicle 10, or an end instruction is transmitted to the work vehicle 10 via the communication apparatus held by the user, the processing is terminated. If the processing is terminated, the series of processes shown in FIG. 4 is terminated; otherwise, the process returns to step S101 to repeat the processes.

As described above, the work vehicle 10 according to this embodiment transmits, if the work mode has been changed, change information to the management apparatus 20 while successively transmitting the work information of the work vehicle 10 to the management apparatus 20. This allows the management apparatus 20 to store the work information for each work mode. Therefore, as will be described later, the management apparatus 20 can specify the presence/absence, the increase/decrease, the cause, and the like of a failure by analyzing specific work information obtained in a specific work mode. The management apparatus 20 can also specify a suitable work mode or a work mode to be recommended. The work vehicle 10 operates by receiving the information of the recommended work mode specified by the management apparatus 20, and can thus perform the work in the suitable work mode.

<Processing of Management Apparatus>

Figure 5:
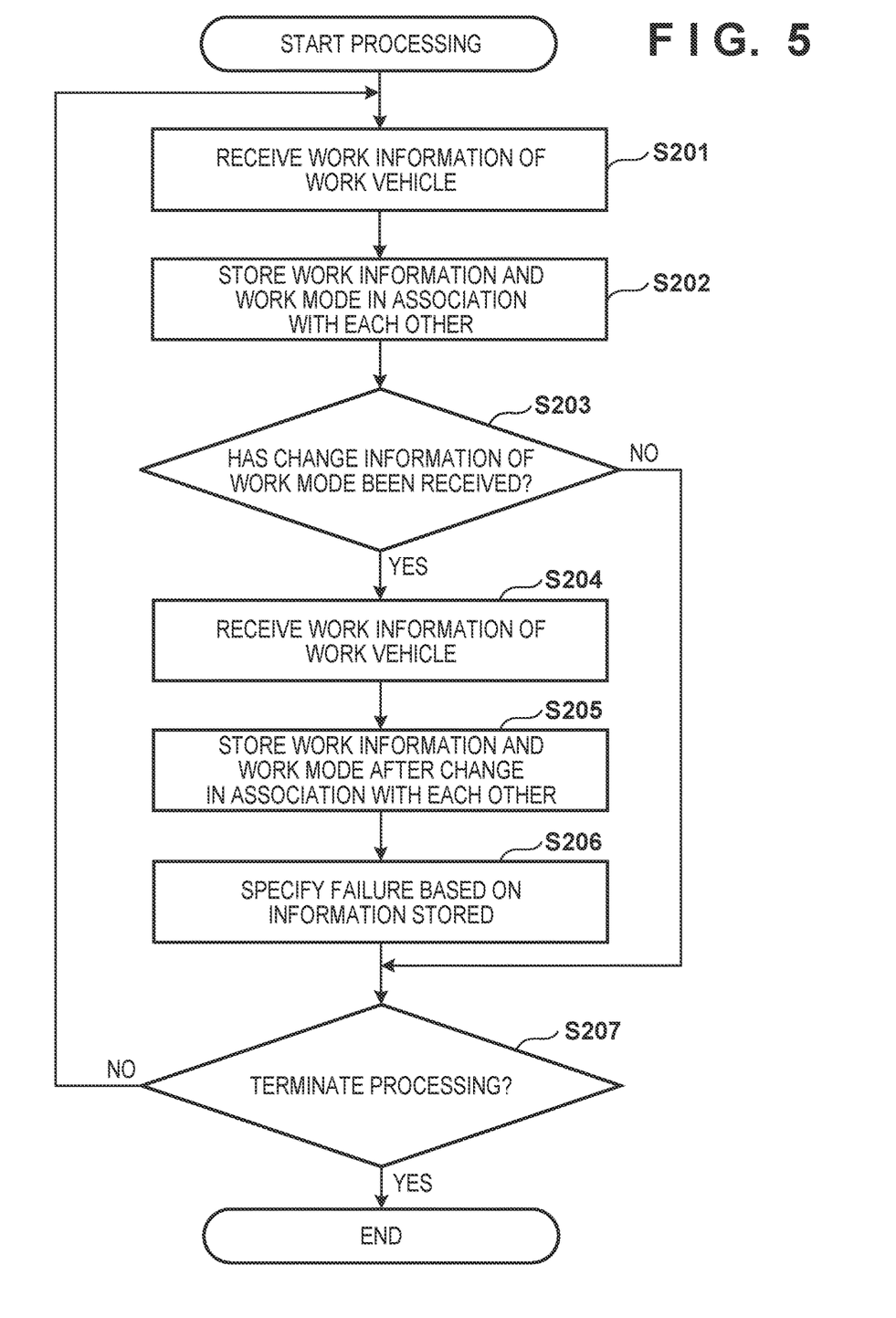
FIG. 5 is a flowchart illustrating the procedure of processing performed by the management apparatus according to the embodiment.

Subsequently, the procedure of processing executed by the management apparatus 20 according to this embodiment will be described with reference to a flowchart shown in FIG. 5. In step S201, the work information reception unit 252 receives the work information of the work vehicle 10 transmitted from the work vehicle 10.

In step S202, the control unit 251 stores the work information of the work vehicle 10 received by the work information reception unit 252 and the current work mode of the work vehicle 10 in association with each other in the storage unit 254. As the type of the work mode to be associated, the work mode received from the work vehicle 10 before is used. If the work mode information could not be received in the past, this step may be skipped.

In step S203, it is determined whether the change information reception unit 253 has received the change information of the work mode of the work vehicle 10. If the change information has been received, the process advances to step S204; otherwise, the process advances to step S207.

In step S204, the work information reception unit 252 receives the work information of the work vehicle 10 transmitted from the work vehicle 10. In step S205, the control unit 251 stores the work information of the work vehicle 10 received by the work information reception unit 252 and the work mode of the work vehicle 10 after the change in association with each other in the storage unit 254.

In step S206, the specifying unit 255 specifies the presence/absence, the increase/decrease, the cause, and the like of a failure based on the information stored and accumulated in the storage unit 254. Furthermore, the specifying unit 255 may specify a work mode suitable for the work vehicle 10 or a work mode to be recommended. For example, the work mode with the less failure may be specified as a work mode to be recommended.

As an example, when the mode concerning the traveling speed of the work vehicle 10 is the high speed mode, a failure that the slip ratio representing the ratio at which the wheels of the work vehicle 10 slip increases, as compared with the medium speed mode, is specified. If a slip occurs, self-position estimation accuracy lowers, and the work vehicle 10 may not be able to return to a charging station (not shown) where the work vehicle 10 is charged. Thus, if the slip ratio increases, for example, if the slip ratio increases to a threshold or more in the high speed mode, the medium speed mode may be specified as a work mode to be recommended.

When the mode concerning the traveling speed of the work vehicle 10 is the low speed mode, if a failure that a work is not completed within a set work time is specified, the medium or high speed mode may be specified as a work mode to be recommended. For example, by calculating the work completion ratio indicating the ratio of the work completion area to the scheduled work area accumulated as the work information, it is possible to determine whether the work is completed within the remaining work time.

Similarly, when the mode concerning the work time is the short time mode, if a failure that the work is not completed within a preset work time is specified, the medium or long time mode may be specified as a work mode to be recommended. Similarly, by calculating the work completion ratio indicating the ratio of the work completion area to the scheduled work area accumulated as the work information, it is possible to determine whether the work is completed within the remaining work time.

When the mode concerning the traveling speed of the work vehicle 10 is the high speed mode, if the blade load accumulated as the work information increases to a threshold or more, the life of the blade may be shortened, and thus the medium speed mode may be specified as a work mode to be recommended.

When the mode concerning the rotation speed of the blade of the work vehicle 10 is the low speed mode, if the blade load accumulated as the work information increases to the threshold or more, as compared with the medium and high speed modes, the life of the blade may be shortened. Therefore, the medium or high speed mode may be specified as a work mode to be recommended.

When the mode concerning the work start point is the point A mode, if the work completion ratio indicating the ratio of the work completion area to the scheduled work area accumulated as the work information, is improved as compared with the point B mode and the point C mode, the point A mode may be specified as a work mode to be recommended.

In step S207, the control unit 251 determines whether to terminate the processing. As already described in step S104, for example, if all the scheduled work is complete, the user presses the power off button (not shown) provided in the work vehicle 10, or an end instruction is transmitted to the work vehicle 10 via the communication apparatus held by the user, the processing is terminated. On the side of the management apparatus 20, if it is detected that communication with the work vehicle 10 is disconnected, the power of the work vehicle 10 is turned off, or the end instruction is transmitted to the work vehicle 10 via the communication apparatus held by the user, the processing is terminated. If the processing is terminated, the series of processes shown in FIG. 5 is terminated; otherwise, the process returns to step S201 to repeat the processes, and the work information is accumulated.

As described above, the management apparatus 20 according to this embodiment successively receives the work information of the work vehicle 10, and stores, for each work mode, the pieces of work information in association with each other using the change information received when the work mode of the work vehicle 10 is changed. This allows the management apparatus 20 to specify the presence/absence, the increase/decrease, the cause, and the like of a failure by analyzing specific work information obtained in a specific work mode. Furthermore, the management apparatus 20 can also specify a suitable work mode or a work mode to be recommended. The work vehicle 10 operates in the recommended work mode specified by the management apparatus 20, and can thus perform a work in the suitable work mode.

[Modification]

Note that this embodiment has explained a case in which the number of work vehicles 10 is one. However, the present invention is also applicable to a case in which there are a plurality of work vehicles.

For example, the work information reception unit 252 may receive work information from each of a plurality of work vehicles of a single type, and the change information reception unit 253 may receive work mode change information from each of the plurality of work vehicles of the single type. That is, information may be collected from work machines of the same type that perform works in different work areas (for example, work machine X that performs a work in A's garden, and work machine X that performs a work in B's garden). In this case, the specifying unit 255 statistically specifies a failure or the like based on the pieces of information stored in the storage unit 254 with respect to the plurality of work vehicles of the single type.

The work information reception unit 252 may receive work information from each of a plurality of work vehicles that operate in the same work area, and the change information reception unit 253 may receive work mode change information from each of the plurality of work vehicles that operate in the same work area. In this case, the specifying unit 255 statistically specifies a failure or the like based on the pieces of information stored in the storage unit 254 with respect to the plurality of work vehicles that operate in the same work area. The plurality of work vehicles need not be of a single type, and may include work vehicles of different types.

To specify a suitable work mode early when there are the plurality of work vehicles that operate in the same work area, the following control processing may be performed.

For example, the control unit 251 operate, in different work modes, the plurality of work vehicles that operate in the same work area. The work information reception unit 252 receives work information from each of the plurality of work vehicles operated in the different work modes. The control unit 251 stores the received work information in the storage unit 254 for each work mode. The specifying unit 255 statistically specifies a failure based on the pieces of information stored in the storage unit 254 with respect to the plurality of work vehicles, and also specifies, as a work mode to be recommended, the work mode with the less failure or the work mode with improved work efficiency. Then, the control unit 251 operates the plurality of work vehicles in the work mode specified by the specifying unit 255. For example, when the control unit 251 transmits a work mode change instruction to the plurality of work vehicles, the plurality of work vehicles can be operated in the recommended work mode. Alternatively, when the notification unit 256 notifies the communication apparatus of the user of the recommended work mode, the user may manually change the work mode of each work vehicle to the recommended work mode. As described above, by operating the work vehicles in the different work modes first, and collecting information, it is possible to discover a suitable work mode early. Therefore, the work efficiency can be improved.

Furthermore, this embodiment has explained an example in which work information is accumulated for each of the plurality of work modes. However, it is not always necessary to specify an optimum work mode by accumulating data of work information in various work modes. For example, based on pieces of work information before and after the work mode is changed, which of the work modes is suitable is determined. If the work mode before the change is more suitable than that after the change, control may be executed to transmit, to the work vehicle 10, an instruction to return the work mode to that before the change.

The specifying unit 255 may specify the increase/decrease of a failure based on the change between the work information received and accumulated before the work mode is changed and the work information received and accumulated after the work mode is changed. For example, based on the work information accumulated in the work mode after the change, it may be specified that a failure increases in the work mode after the change. In this case, the notification unit 256 may notify the communication apparatus of the user that the work mode before the change is more suitable. Alternatively, instead of making a notification to the communication apparatus of the user, the control unit 251 may transmit, to the work vehicle, an instruction to return the work mode to that before the change, and operate the work vehicle in the work mode before the change. This can prevent the work vehicle from operating in an unsuitable work mode.

The case in which a failure is specified and a work mode to be recommended is specified in step S206 has been explained. However, the notification unit 256 may transmit the recommended work mode specified by the specifying unit 255 to the work vehicle or the communication apparatus of the user, thereby making a recommendation. After the user confirms the recommended contents, he/she can change the work mode of the work vehicle, as needed.

This embodiment has explained an example in which the specifying unit 255 specifies a failure and a recommended work mode based on the failure. However, the specifying unit 255 may specify a work mode with high work efficiency. For example, based on the first work information of the first work vehicle operating in the first work mode and the second work information of the second work vehicle operating in the second work mode among a plurality of work vehicles, the work mode of the work machine with higher work efficiency may be specified. In this case, the notification unit 256 may notify the communication apparatus of the user of the work mode of the work vehicle with higher work efficiency specified by the specifying unit 255. An example of the work efficiency may be a work completion ratio accumulated as work information. For example, a difference in work completion ratio among the work modes may be specified, and a work mode with a high work completion ratio may be specified and the communication apparatus may be notified of it.

(Others)

Several preferred embodiments have been described above. However, the present invention is not limited to these examples and may partially be modified without departing from the scope of the invention. For example, another element may be combined with the contents of each embodiment in accordance with the object, the application purpose, and the like, and part of the contents of a certain embodiment may be combined with the contents of another embodiment. In addition, individual terms described in this specification are merely used for the purpose of explaining the present invention, and the present invention is not limited to the strict meanings of the terms and can also incorporate their equivalents.

Furthermore, a program that implements at least one function described in the embodiments is supplied to a system or an apparatus via a network or a storage medium, and at least one processor in the computer of the system or the apparatus can read out and execute the program. The present invention can be implemented by this form as well.

Summary of Embodiment

According to the first aspect, a management apparatus is a management apparatus (for example, 20) for managing a work machine (for example, 10) capable of operating in a plurality of work modes, comprising:

work information reception means (for example, 252, 200b, S201, S204) for receiving work information of the work machine;

change information reception means (for example, 253, 200b, S203) for receiving, if a work mode of the work machine is changed, work mode change information from the work machine;

storage means (for example, 254, 200c) for storing the work information and the work mode in association with each other; and specifying means (for example, 255, 200a) for specifying a failure based on information stored in the storage means.

This makes it possible to grasp detailed information such as a work mode in which a failure easily occurs.

According to the second aspect, in the management apparatus, the work information reception means receives work information from each of a plurality of work machines of a single type, the change information reception means receives work mode change information from each of the plurality of work machines of the single type, and the specifying means statistically specifies the failure based on pieces of information stored in the storage means with respect to the plurality of work machines of the single type.

This makes it possible to specify a failure using pieces of statistic information of various work machines. Thus, it is also possible to specify a work mode to be widely, generally recommended, instead of a recommended work mode limited to a specific work machine.

According to the third aspect, in the management apparatus, the work information reception means receives work information from each of a plurality of work machines that operate in the same work area, the change information reception means receives work mode change information from each of the plurality of work machines that operate in the same work area, and the specifying means statistically specifies the failure based on pieces of information stored in the storage means with respect to the plurality of work machines that operate in the same work area.

Thus, it is possible to specify a work mode suitable for a specific work area by specifying a failure using pieces of information of the plurality of work machines in the specific work area.

According to the fourth aspect, in the management apparatus, the specifying means further specifies the work mode with the less failure as a work mode to be recommended.

This makes it possible to specify the work mode with the less failure.

According to the fifth aspect, the management apparatus further comprises control means (for example, 251, 200a, 200b) for controlling an operation of the work machine, the control means operates, in different work modes, a plurality of work machines that operate in the same work area, based on pieces of information stored in the storage means with respect to the plurality of work machines, the specifying means statistically specifies the failure, and also specifies the work mode with the less failure as a work mode to be recommended, and the control means operates each of the plurality of work machines in the work mode specified by the specifying means.

This makes it possible to early specify a suitable work mode in which a failure hardly occurs.

According to the sixth aspect, in the management apparatus, the specifying means specifies increase/decrease of the failure based on a change between work information before the work mode is changed and work information after the work mode is changed, and the management apparatus further comprises notification means (for example, 256, 200b) for making, if the failure increases in the work mode after the change, a notification that the work mode before the change is more suitable.

This allows the user to grasp early that the work mode before is a more suitable work mode.

According to the seventh aspect, in the management apparatus, the specifying means specifies increase/decrease of the failure based on a change between work information before the work mode is changed and work information after the work mode is changed, and the management apparatus further comprises control means (for example, 251, 200a, 200b) for operating, if the failure increases in the work mode after the change, the work machine in the work mode before the change.

This makes it possible to automatically prevent the work machine from operating in an unsuitable work mode.

According to the eighth aspect, in the management apparatus, the specifying means specifies increase/decrease of the failure based on a change between work information before the work mode is changed and work information after the work mode is changed, and specifies, if the failure increases in the work mode after the change, based on an accumulation result of information stored in the storage means, the work mode with the less failure as a work mode to be recommended, and the management apparatus further comprises notification means (for example, 256, 200b) for making a notification of the work mode specified by the specifying means.

Thus, if the failure increases by changing the work mode, the user can grasp a suitable work mode with the less failure early from accumulated information.

According to the ninth aspect, in the management apparatus, based on first work information of a first work machine operating in a first work mode and second work information of a second work machine operating in a second work mode among a plurality of work machines, the specifying means specifies the work mode of the work machine with higher work efficiency, and the management apparatus further comprises notification means (for example, 256, 200b) for making a notification of the work mode specified by the specifying means.

This allows the user to grasp a work mode with improved work efficiency.

According to the 10th aspect, in the management apparatus, the work modes include at least one of a set of a plurality of modes concerning a work speed of a work portion provided in the work machine, a set of a plurality of modes concerning a traveling speed of the work machine, a set of a plurality of modes concerning a work time of the work machine, and a set of a plurality of modes concerning a work start point of the work machine.

This makes it possible to collect work information for each of the various work modes.

According to the 11th aspect, in the management apparatus, the work information includes at least one of a slip ratio indicating a ratio at which a slip occurs in the work machine, an engine speed for causing the work machine to travel, a load imposed on a work portion provided in the work machine, and a completion ratio of a work performed by the work machine.

This makes it possible to collect various kinds of work information.

According to the 12th aspect, a control method for a management apparatus is a control method for a management apparatus (for example, 20) that manages a work machine (for example, 10) capable of operating in a plurality of work modes, comprising:

a work information reception step (for example, S201, S204) of receiving work information of the work machine;

a change information reception step (for example, S203) of receiving, if a work mode of the work machine is changed, work mode change information from the work machine;

a storage step (for example, S205) of storing the work information and the work mode in association with each other in storage means (for example, 254); and a specifying step (for example, S206) of specifying a failure based on information stored in the storage means.

This makes it possible to grasp detailed information such as a work mode in which a failure easily occurs.

According to the 13th aspect, a non-transitory computer-readable storage medium is a non-transitory computer-readable storage medium storing a program for causing a computer to execute a control method for a management apparatus defined in the 12th aspect.

This allows the computer to implement processing of the control method for the management apparatus.

According to the present invention, it is possible to grasp detailed information such as a work mode in which a failure easily occurs.

What is claimed is:

1. A management apparatus for managing a work machine capable of operating in a plurality of work modes, comprising:
   one or more memories storing instructions; and
   one or more processors executing the instructions to:
   receive work information of the work machine;
   receive, if a work mode of the work machine is changed, work mode change information from the work machine;
   store the work information and the work mode in association with each other;
   specify a failure based on the stored information; and
   control an operation of the work machine,
   wherein the one or more processors further execute the instructions to:
      specify increase/decrease of the failure based on a change between work information before the work mode is changed and work information after the work mode is changed, and
      operate, if the failure increases in the work mode after the change, the work machine in the work mode before the change,
   wherein the work modes include a plurality of traveling speed modes concerning a traveling speed of the work machine,
   wherein the work information includes a slip ratio indicating a ratio at which a slip occurs in the work machine,
   wherein the one or more processors further execute the instructions to:
      specify increase/decrease of the slip ratio based on a change between a slip ratio in a first traveling speed mode and a slip ratio in a second traveling speed mode that is changed from the first traveling speed mode, and
      switch, if the slip ratio increases in the second traveling speed mode, to the first traveling speed mode, and operate the work machine in the first traveling speed mode.

2. The apparatus according to claim 1, wherein the one or more processors further execute the instructions to:
   receive work information from each of a plurality of work machines of a single type,
   receive work mode change information from each of the plurality of work machines of the single type, and
   statistically specify the failure based on pieces of the stored information with respect to the plurality of work machines of the single type.

3. The apparatus according to claim 1, wherein the one or more processors further execute the instructions to:
   receive work information from each of a plurality of work machines that operate in the same work area,
   receive work mode change information from each of the plurality of work machines that operate in the same work area, and
   statistically specify the failure based on pieces of the stored information with respect to the plurality of work machines that operate in the same work area.

4. The apparatus according to claim 1, wherein the one or more processors further execute the instructions to:
   further specify the work mode with the less failure as a work mode to be recommended.

5. The apparatus according to claim 1, wherein the one or more processors further execute the instructions to:
   operate, in different work modes, a plurality of work machines that operate in the same work area,
   based on pieces of the stored information with respect to the plurality of work machines, statistically specify the failure, and also specify the work mode with the less failure as a work mode to be recommended, and
   operate each of the plurality of work machines in the specified work mode.

6. The apparatus according to claim 1, wherein the one or more processors further execute the instructions to:
   specify increase/decrease of the failure based on a change between work information before the work mode is changed and work information after the work mode is changed, and
   make, if the failure increases in the work mode after the change, a notification that the work mode before the change is more suitable.

7. The apparatus according to claim 1, wherein the one or more processors further execute the instructions to:
   specify increase/decrease of the failure based on a change between work information before the work mode is changed and work information after the work mode is changed, and specify, if the failure increases in the work mode after the change, based on an accumulation result of the stored information, the work mode with the less failure as a work mode to be recommended, and make a notification of the specified work mode.

8. The apparatus according to claim 1, wherein the one or more processors further execute the instructions to:
based on first work information of a first work machine operating in a first work mode and second work information of a second work machine operating in a second work mode among a plurality of work machines, specify the work mode of the work machine with higher work efficiency, and
make a notification of the specified work mode.

9. The apparatus according to claim 1, wherein the work modes include at least one of a set of a plurality of modes concerning a work speed of a work portion provided in the work machine, a set of a plurality of modes concerning a traveling speed of the work machine, a set of a plurality of modes concerning a work time of the work machine, and a set of a plurality of modes concerning a work start point of the work machine.

10. The apparatus according to claim 1, wherein the work information includes at least one of a slip ratio indicating a ratio at which a slip occurs in the work machine, an engine speed for causing the work machine to travel, a load imposed on a work portion provided in the work machine, and a completion ratio of a work performed by the work machine.

11. A control method for a management apparatus that manages a work machine capable of operating in a plurality of work modes, comprising:
receiving work information of the work machine;
receiving, if a work mode of the work machine is changed, work mode change information from the work machine;
storing the work information and the work mode in association with each other in a storage unit;
specifying a failure based on the information stored in the storage unit; and
controlling an operation of the work machine,
wherein in the specifying, increase/decrease of the failure is specified based on a change between work information before the work mode is changed and work information after the work mode is changed, and
in the controlling, if the failure increases in the work mode after the change, the work machine is operated in the work mode before the change,
wherein the work modes include a plurality of traveling speed modes concerning a traveling speed of the work machine,
wherein the work information includes a slip ratio indicating a ratio at which a slip occurs in the work machine, and
wherein the control method further comprising:
specifying an increase/decrease of the slip ratio based on a change between a slip ratio in a first traveling speed mode and a slip ratio in a second traveling speed mode that is changed from the first traveling speed mode, and
switching, if the slip ratio increases in the second traveling speed mode, to the first traveling speed mode, and operating the work machine in the first traveling speed mode.

12. A non-transitory computer-readable storage medium storing a program for causing a computer to execute a control method for a management apparatus defined in claim 11.

* * * * *